United States Patent [19]

Yamada et al.

[11] Patent Number: 4,966,266

[45] Date of Patent: Oct. 30, 1990

[54] CLUTCH FOR AUTOMOBILE DOOR LOCK ACTUATOR

[75] Inventors: Shinjiro Yamada; Seiki Satoh, both of Utsunomiya, Japan

[73] Assignee: Mitsui Kinzoku Kogyo Kabushiki Kaisha, Tokyo, Japan

[21] Appl. No.: 325,422

[22] Filed: Mar. 20, 1989

[30] Foreign Application Priority Data

Mar. 19, 1988 [JP] Japan .................................. 63-66978
May 12, 1988 [JP] Japan ................................ 63-115739

[51] Int. Cl.$^5$ ..................... F16D 43/02; E05B 47/00; F16H 57/00
[52] U.S. Cl. ........................................ 192/39; 70/237; 74/625; 192/54; 192/71; 192/67 P; 192/93 A; 292/201
[58] Field of Search .................. 192/0.02 R, 35, 36, 192/37, 39, 71, 76, 54, 67 P, 93 A; 74/625; 70/237, 279; 292/201, 336.3

[56] References Cited

U.S. PATENT DOCUMENTS

| 4,093,289 | 6/1978 | Inabayashi et al. | 292/201 |
| 4,458,795 | 7/1984 | Norton | 192/71 |
| 4,520,914 | 6/1985 | Kagiyama et al. | 70/279 |
| 4,616,527 | 10/1986 | Frey et al. | 74/625 |
| 4,645,050 | 2/1987 | Ingenhoven | 192/35 |
| 4,706,512 | 11/1987 | McKernon et al. | 74/625 |
| 4,736,829 | 4/1988 | Noel | 192/71 |
| 4,779,912 | 10/1988 | Ikeda et al. | 292/201 |
| 4,850,466 | 7/1989 | Rogakos et al. | 192/76 |

FOREIGN PATENT DOCUMENTS 260978 11/1987 Japan .

Primary Examiner—Rodney H. Bonck
Attorney, Agent, or Firm—Browdy & Neimark

[57] ABSTRACT

An actuator for automobile comprises a speed reduction mechanism having an input side connected to a motor and an output side provided with an engagement section, a first rotor provided with a predetermined rotational resistance, at least one engagement rod slidably provided in the first rotor, inwardly biased by a spring providing a spring force weaker than the force of the rotational resistance and outwardly projected with an inner end in engagement with engagement section with rotation of the reduction mechanism, and a second rotor with an engagement piece to engage with the free end of the engagement rod with outward projection thereof and connected to a door lock device or the like. When the motor is rotated, the reduction mechanism and second rotor are coupled together directly via the engagement rod. When the motor is stopped, the second rotor and engagement rod are disengaged from each other.

4 Claims, 4 Drawing Sheets

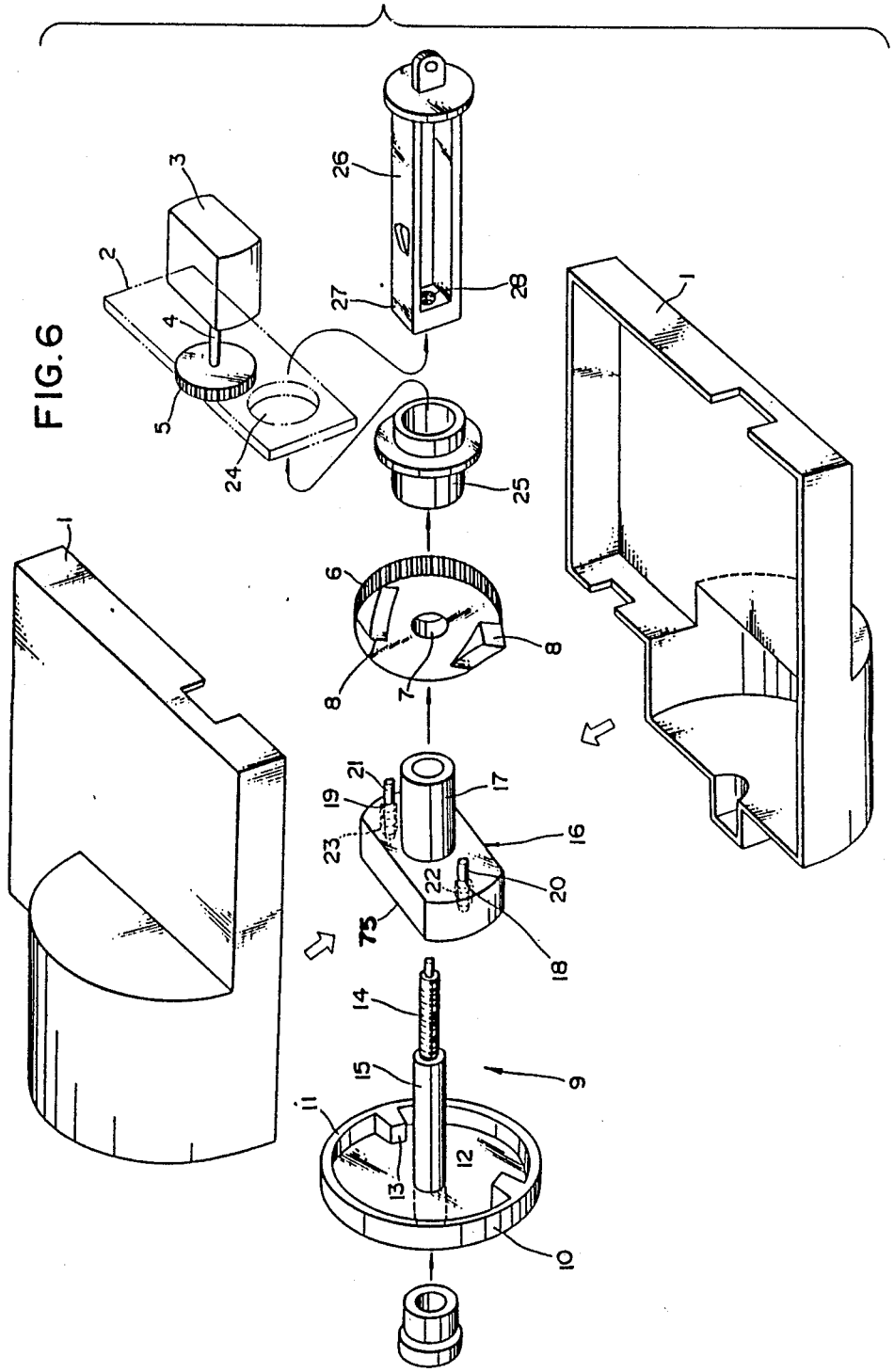

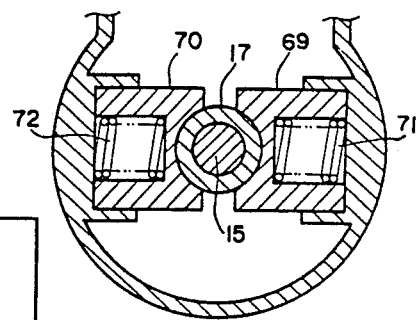
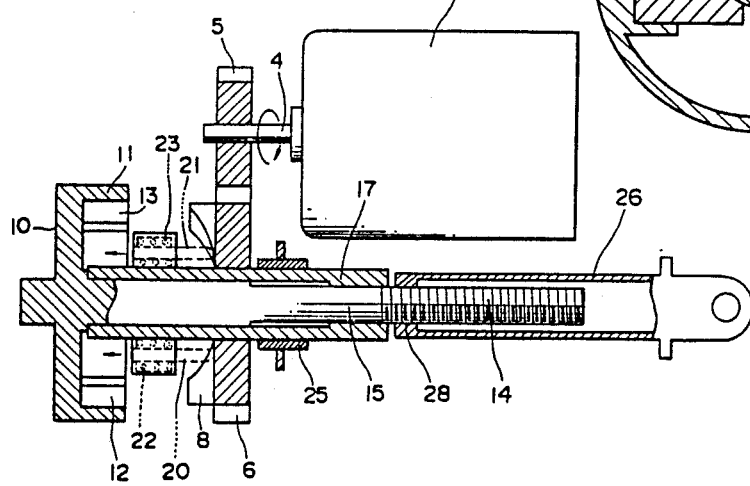
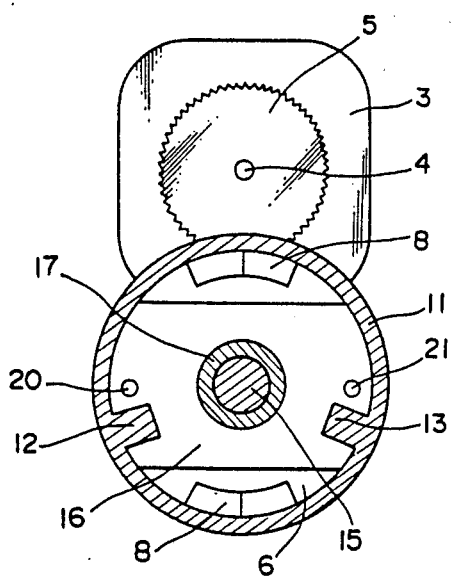
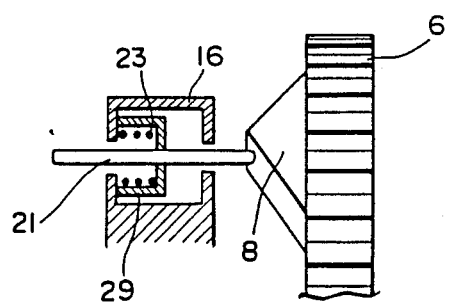

4,966,266

CLUTCH FOR AUTOMOBILE DOOR LOCK ACTUATOR

BACKGROUND OF THE INVENTION

This invention relates to a clutch for an actuator for an automobile and, more particularly, to a clutch mechanism for a motor-type actuator, which switches a door lock device between locked and unlocked states.

It is well known in the art to switch locked state and unlocked state of a door lock device with a motor-type actuator. The actuator is provided with a clutch mechanism, which transmits the rotation of a motor to a lock mechanism of the door lock device but does not cause rotation of the motor when the lock mechanism is switched manually with a door key.

While the clutch mechanism uses a centrifugal clutch, the centrifugal clutch does not provide a reliable effect unless it is rotated at a high speed. Therefore, a centrifugal clutch is mounted directly on the output shaft of the motor, and a speed reduction mechanism is provided between the centrifugal clutch and lock mechanism (Japanese Patent Laid-Open No. 62-260,978).

With this prior art mechanism, manually switching the lock mechanism causes rotation of the speed reduction mechanism, so that it requires rather a heavy manual operation.

SUMMARY OF THE INVENTION

An object of the invention, according, is to provide a clutch, which is reliably operable even at a low-speed rotation.

BRIEF DESCRIPTION OF THE DRAWINGS

FIG. 5 is a sectional view showing a resistor;

FIG. 6 is an exploded perspective view showing a second embodiment of the actuator;

FIG. 7 is a sectional view showing the second embodiment;

FIG. 8 is a sectional view showing the actuator when the motor is "off"; and

FIG. 9 is an enlarged-scale view showing a projection and an engagement rod.

DETAILED DESCRIPTION OF THE PREFERRED EMBODIMENTS

Figure 1:
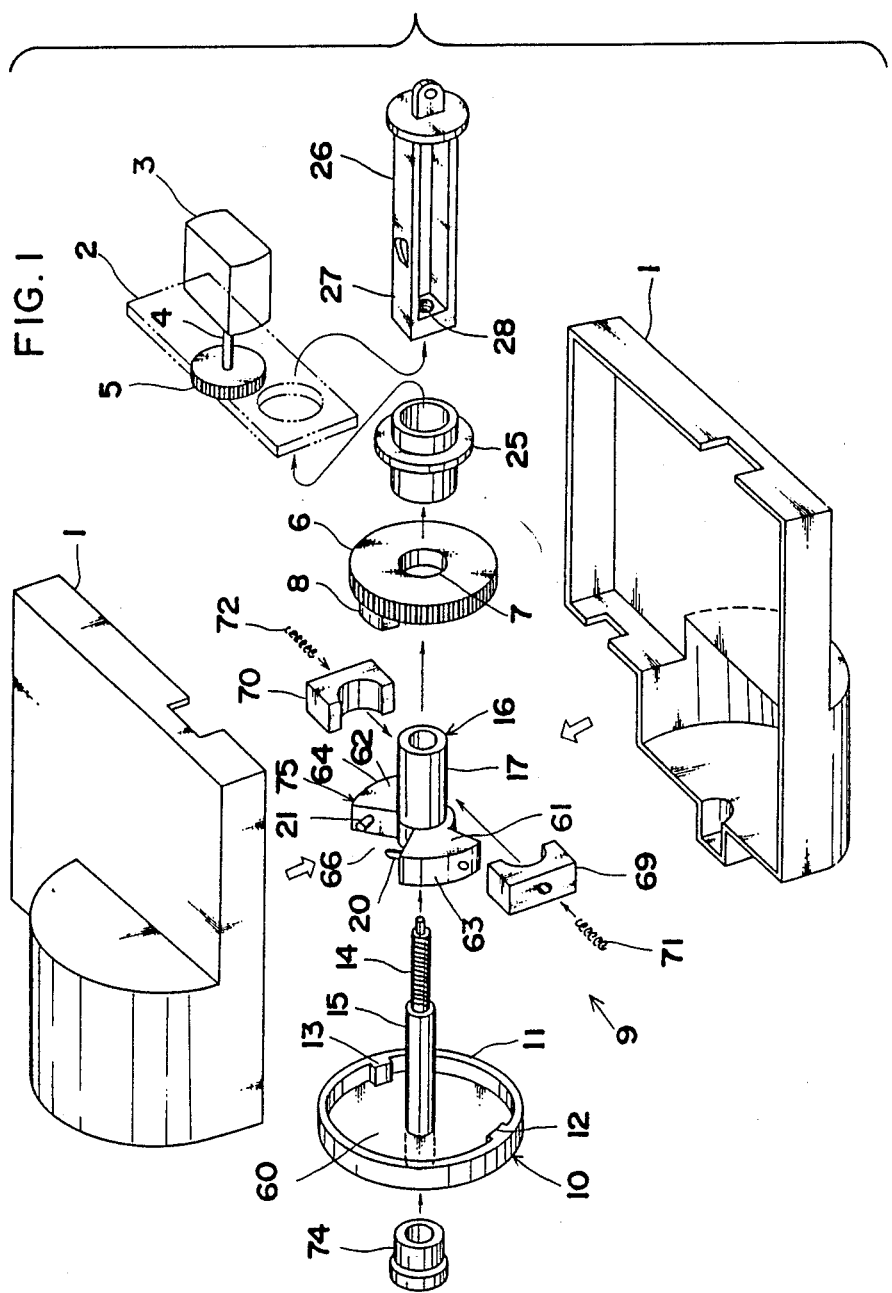
FIG. 1 is an exploded perspective view showing a first embodiment of the actuator.
Figure 2:
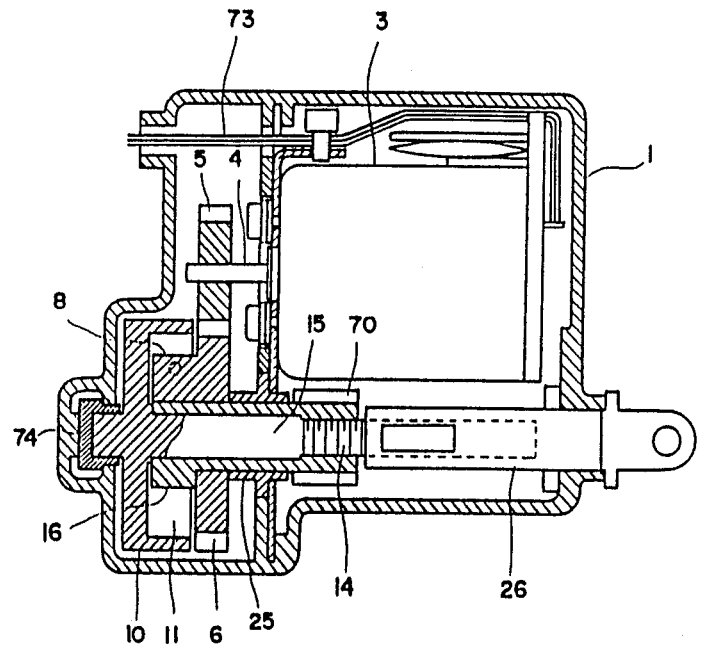
FIG. 2 is a sectional view showing the first embodiment.

A first embodiment of the invention will now described with reference to the drawings. Reference numeral 1 designates a pair of case halves of an actuator for an automobile. A mounting plate 2 is provided in the case 1, and a motor 3 is secured to the plate 2. A gear 5 secured to an output shaft 4 of the motor 3 is meshed with a reduction gear 6. The gear 6 has a hole 7 at the central position thereof and a projection 8 projecting from one side.

Numeral 9 is a clutch mechanism having a first rotor 16 and a second rotor 10. The second rotor 10 has a drum section 60 and a shaft 15. The drum section 60 has its peripheral wall formed with a plurality of, suitably a pair of, inwardly projecting engagement portions 12, 13.

The first rotor 16 has a sleeve 17 rotatably fitted on the shaft 15 and a head section 75 extending within the drum section 60 of the second rotor 10. The head section 75 consists of a pair of, i.e., left and right, sector-like portions 61, 62. The outer surfaces 63, 64 of the sector-like portions 61, 62 are suitably arcular concentric with the peripheral wall 11 of the second rotor 10. The inner surface of the peripheral wall 11 and outer surfaces 63, 64 of the sector-like portions 61, 62 define between a predetermined gap 65 greater than the extent of projection of the engagement portions 12, 13. Thus, engagement between the portions 12, 13 and the sector-like portions 61, 62 is not caused with rotation of the first rotor 16.

The sector-like portions 61, 62 are formed with through holes 18, 19 extending from the space 66 between the portions 61 and 62 to the outer surfaces 63, 64, and engagement members 20, 21 having flanges 29, 30 are slidably provided in the holes 18, 19. The engagement members 20, 21 are biased by springs 22, 23 such that their inner ends 67, 68 project into the space 66. The reduction gear 6 is rotatably mounted on a shaft 17 of the first rotor 16, and the projection 8 of the reduction gear 6 is found in the space 66. Thus, when the reduction gear 6 is rotated, the projection 8 is brought into engagement with and pushes out the member 20 or member 21.

Figure 4:
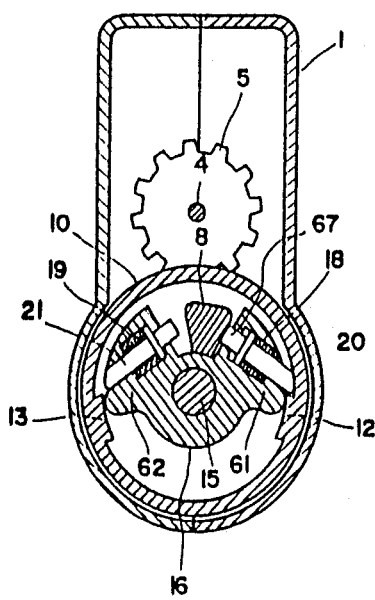
FIG. 4 is a sectional view showing the actuator when the motor is "on"
Figure 3:
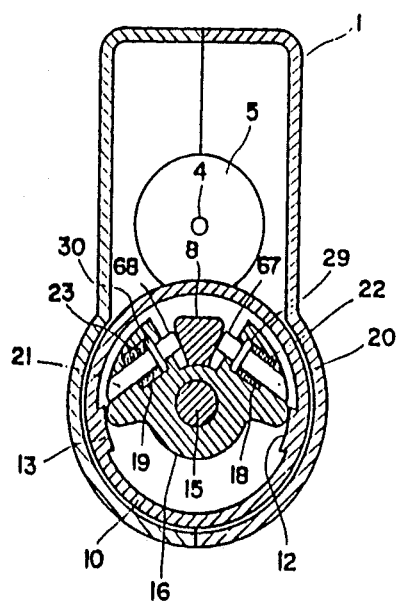
FIG. 3 is a sectional view showing an actuator when the motor is off.

Numerals 69, 70 designate a pair of resistors, which are held in frictional contact with the sleeve 17 of the first rotor 16 by springs 71, 72, thus providing a rotational resistance to the first rotor 16. The resistances of the resistors 69, 70 and spring forces of the springs 22, 23 are related to one another such that, as shown in FIG. 4, when the projection 8 is brought into contact with the engagement member 20 with the rotation of the reduction gear 6, the projection 8 causes outward projection of the end of the engagement member 20 against the spring force of the springs 22 and that the first rotor 16 is rotated after the projection of the engagement member 20. In other word, the resistances of the resistors 69, 70 are set to be stronger than the spring forces of the springs 22, 23.

The sleeve 17 is rotatably mounted in a collar 25 fitted in a mounting hole 24 formed in the plate 2.

The shaft 15 of the second rotor 10 has a free end portion formed with a thread 14, on which a threaded holed 28 formed in a base 27 of a movable body 26 is screwed. The movable body 26 is angular in sectional profile and mounted in the case 1 such that it is capable of only sliding. Its free end is connected to a sill knob of the door lock device via rod or a wire.

In the Figures, numeral 73 designates a connection cord connecting the motor 3 to a switch, and 74 a collar fitted on the end of the shaft 15 of the second rotor 10.

FIGS. 6 to 9 show a second embodiment. In the clutch mechanism of this embodiment, the engagement member 20, 21 and shaft 15 are parallel. Parts providing functions like those in the previous embodiment are designated by like reference numerals.

The projection 8 of the reduction gear 6 is triangular. In the Figure, the reduction gear 6 has a pair of projections, but it is possible to provide only a single projection as in the first embodiment.

The head section 75 of the first rotor 16 is substantially rectangular because the space 66 is unnecessary. The head section 75, unlike the first embodiment, is provided on the outer side of the second rotor 10 as shown in FIG. 7. The outer periphery of the head section 75 is formed at positions corresponding to the projections 12, 13 of the second rotor 10 with the through holes 18, 19 extending parallel to the shaft 15, and engagement rods 20, 21 are provided in the holes 18, 19. The engagement members 20, 21 are biased by the springs 22, 23 such that one end of them projects toward the cam projections 8.

In this second embodiment, the resistors 69, 70 in the first embodiment are dispensed with by providing rotational resistance between the collar 25 and sleeve 17.

OPERATION

In the case of motor operation:

In the first embodiment of FIGS. 1 to 5, when the gear 5 is rotated by the motor, the projection 8 of the reduction gear 6 is rotated in the space 66 between the sector-like portions 61 and 62. For instance, when the projection 8 is rotated in the clockwise direction in FIG. 3, it is brought into engagement with the inner end 67 of the rod 20 in the sector-like portion 61. As a result, the engagement rod 20 is pushed out against the spring force of the spring 22 for the first rotor 16 is held by the forces of the resistors 69, 70 stronger than the spring force of the spring 22. When the end of the engagement rod 20 projects, the first rotor 16 is rotated clockwise direction against the resistors 69, 70, thus causing the free end of the engagement rod 20 to be engaged with either engagement portion 12 or 13 of the second rotor 10.

Thus, the rotation of the motor 3 is transmitted to the second rotor 10, and with the rotation of the shaft 15 of the second rotor 10 the body 26 screwed in the threaded portion 14 is moved in the axial direction to cause operation of the lock device via an operating rod connected to the body 26.

Now, the operation of the second embodiment shown in FIGS. 6 to 9 will be described. When the reduction gear 6 is rotated by the motor 3 to cause rotation of the projections 8 in the clockwise direction in FIG. 8, the projections 8 engage with and urge the inner ends 67, 68 of the engagement members 20, 21. At this time, the free ends of the engagement rods 20, 21 are pushed in the thrust direction up to a position to engage with the engagement portions 12, 13 of the second rotor 10.

When the projection of the engagement rods 20, 21 is completed, the cam projections 8 and engagement rods 20, 21 completely engage one another, and the rotation of the gear 8 is transmitted to the first rotor 16. When the first rotor 16 is rotated, the free ends of the rods 20, 21 engage with the portions 12, 13 of the second rotor 10. Consequently, the second rotor 10 is rotated, and with the rotation of the shaft 15 the body 26 continues to be moved to operate the lock device.

In the case of manual operation:

When the motor 3 is "off", the engagement rods 20, 21 are both returned to non-engagement position by the elastic force of the springs 22 and 23, and the first and second rotors 16, 10 are free.

By manually moving the body 26 in this state, the second rotor 10 is rotated through the threaded rod 14, but the first rotor 16, reduction gear 6 and motor 3 are not rotated. Thus, the movable body 26 can be moved very lightly.

What is claimed is:

1. An actuator for an automobile having a motor comprising:
   a speed reduction mechanism having an input side connected to said motor and an output side provided with an engagement section;
   a first rotor provided with a predetermined rotational resistance; at least one engagement rod slidably provided in said first rotor, inwardly biased by a spring providing a spring force weaker than the force of said resistance and outwardly projected with an inner end in engagement with said engagement section with rotation of said mechanism; and
   a second rotor with an engagement piece to engage with an outer end of said rod and connected to a door lock device;
   said mechanism and said second rotor being coupled together directly via said rod when said motor is rotated, said second rotor and said rod being disengaged from each other when said motor is stopped.

2. The actuator according to claim 1, wherein said first rotor and a final gear of said mechanism are rotatably mounted on a shaft of said second rotor.

3. The actuator according to claim 2, wherein said first rotor has a pair of sector-like portions forming a space therebetween, each said portion having a passages extending from said space to an arcuate surface, said engagement rods being slidably provided in said passage respectively, said engagement section of said reduction mechanism being provided in said space.

4. The actuator according to claim 2, wherein said first rotor has a passage parallel to said shaft, said engagement rod being slidably provided in said passage.

* * * * *